United States Patent [19]

Strop et al.

[11] Patent Number: 4,619,789

[45] Date of Patent: Oct. 28, 1986

[54] PRETREATMENT PROCESS FOR RENDERING

[76] Inventors: Hans R. Strop, 12418 The Bluffs; Richard R. Perry, 10815 Clearbrook Cir., both of Strongsville, Ohio 44136

[21] Appl. No.: 815,303

[22] Filed: Dec. 27, 1985

Related U.S. Application Data

[63] Continuation of Ser. No. 556,007, Nov. 29, 1983, abandoned.

[51] Int. Cl.$^4$ .................................................. C11B 1/12
[52] U.S. Cl. .................................................... 260/412.6
[58] Field of Search ...................................... 260/412.6

[56] References Cited

U.S. PATENT DOCUMENTS 3,796,737  3/1974  Holboll ............................. 260/412.6
4,259,252  3/1981  Perry et al. ....................... 260/412.6

OTHER PUBLICATIONS

Hawley, *The Condensed Chemical Dictionary*, 10th Edition, Van Nostrand Reinhold Company.

*Primary Examiner*—Charles F. Warren
*Assistant Examiner*—Elizabeth A. Flaherty
*Attorney, Agent, or Firm*—Fay, Sharpe, Fagan, Minnich & McKee

[57] ABSTRACT

A rendering system and method is provided for the rendering of organic materials into its major components comprising water, fat and solid proteins. The process involves mixing additional fat with the raw material to form a pumpable slurry including fat and water emulsions. The slurry is treated to break the emulsions and insolubilize the protein solids wherein the fat becomes a continuous phase fat in the slurry and the water becomes a continuous phase water. The treating comprises adding fat to the raw material having a temperature within the range of 140° F. to 270° F. in an amount such that the ratio of added fat to the dry defatted solids of the slurry is in the range of 4 to 1 to 6 to 1, respectively. The treating further includes partially drying the slurry such that at least 15 percent by weight of water as measured as a percentage of total water and defatted solids remains with the solids which discharge from the partial drying step as part of the partially dried slurry. The treated slurry is centrifuged to split the slurry into at least two streams, a first stream comprising wet solids and a second stream comprising fat. The fat contains less than 0.2 percent insoluble solids. The wet solids are dried and produced as a finished product with less than 6 percent residual fat.

22 Claims, 2 Drawing Figures

PRETREATMENT PROCESS FOR RENDERING

BACKGROUND OF THE INVENTION

This invention pertains to the art of rendering methods and systems. Rendering involves the splitting of organic materials typically of animal origin into its three major component elements comprising water, fat and solid proteinaceous meal. A typical rendering raw material is generally comprised of 25 percent by weight fat, 25 percent solids and 50 percent water. The solids are usually at least 50 percent protein with the remainder comprising bone, minerals and carbohydrates.

Water is a waste material in the rendering process and is usually sewered. Fat and protein are marketable commodities with major uses in a variety of industries. The quality and efficiency of the fat and protein separation are the criteria under which any rendering process is evaluated.

Numerous techniques and processes for rendering have been known and utilized. See U.S. Pat. No. 4,259,252 for a detailed background description of a variety of known rendering methods. However, it has been found that the disadvantages present in most prior rendering methods are such that the methods are of limited economic and practical value.

One known rendering method comprises a dry rendering batch process. By this process a quantity of organic raw material, typically comprising meat by-products, is loaded in a cooker with steam heated jackets and rotors. After the cooker is closed, steam is applied and the charge is heated. Moisture is removed from the batch by venting it as a vapor. When the batch is dry it is dumped. Part of the fat from the batch is drained in a drainage device. The fatty solids from the drainage device are fed to a screw press to remove additional fat. Typically, the residual fat content in the solids subsequent to pressing is in the range from eight to twelve percent. Major disadvantages of this process are low capacity and high operating cost. A single batch cooker may handle a load of five tons of raw materials in two to three hours of operation. Many large rendering plants require capacities of twenty or more tons per hour. Typically, to evaporate one pound of water from the material in the batch cooker requires 1.5 to 2.5 pounds of steam and thus cost of energy to operate a batch system is high. In addition, the use of a screw press to remove fat is particularly expensive both to acquire as capital equipment, and also to operate.

To adapt a batch cooker to high capacity, various manufacturers have developed (notably the Dupps Company of Germantown, Ohio and the Stord-Bartz Company of Bergen, Norway) continuous autoclaves or cookers which allow continuous feeding of raw material and discharging of dried product. While this continuous feed process somewhat alleviated the low capacity problem (continuous cookers may process up to fifteen tons per hour) the cost of energy is still high. In addition, the capital investment and operating costs related to all the steps to separate the fat from the solids are also high. With the mechanical extraction methods prevalent in the industry, it is difficult to achieve residual fat levels of less than ten percent in the solids. As the value of the fat is usually higher than the solids, there is a considerable economic penalty in leaving fat in the meat meal solids.

Another type of continuous rendering method is disclosed in U.S. Pat. No. 4,259,252. In this method the raw material to be rendered is first comminuted and mixed with molten fat. The resulting slurry is subsequently pumped to evaporators to remove moisture. The dry slurry from the evaporator is then centrifuged. Part of the fat separated is returned to slurry more raw material. The solids removed from the centrifuge are then pressed in a conventional manner to remove the residual fat. This system, known commercially as the "C-G system", has a major advantage: high capacity. Systems with capacities of forty to fifty tons per hour have been built in accordance with this method. Another major advantage in the use of evaporators is that they lend themselves to staging, i.e., part of the water may be evaporated in one stage and the vapor from that stage may be conducted to the next evaporator stage to evaporate water in that stage. Thus, energy may be saved by reutilization of the steam energy applied. A corollary advantage of this method is that because the evaporator stages are operated under vacuum, the fat and the meat solids are dried under conditions of low temperature resulting in a quality of the products approaching the intrinsic quality of the components in the raw material fed to the system. However, the fatty solids obtained from the centrifuge must still be treated to remove residual fat. According to this method it is not possible to centrifuge a dried slurry of meat solids to form a cake with less than 30 to 35 percent residual fat. A screw press is most often used to reduce the residual fat level to about ten to twelve percent. The fat from the centrifuge and from the press usually contains a fairly high percentage (such as 2.0 percent or more by weight) of finely divided insoluble solids ("fines") which must be removed by means of a filter press or a polishing centrifuge to reduce the fines to an acceptable level. An acceptable level would be 0.05 to 0.1 percent by weight dependent upon the grade of fat. A substantial problem with this method is that the press and centrifuge represent major capital investments and additional operating cost.

The systems described above are called "dry" methods in the trade because no water is added to the raw material to assist in the extraction of fat. There are also several variations of "wet" rendering methods.

In wet rendering methods hot water is added to the raw material to extract the fat. In theory, this method produces a protein solids material which is very low in fat (substantially below what can be achieved with the mechanical extraction methods such as the screw pressing discussed above in dry rendering methods). Typically wet rendering will produce protein solids of six or seven percent by weight residual fat instead of in excess of ten percent as in the dry rendering methods.

The wet systems have the advantage of relatively low residual fat in the meat meal. The disadvantages of such systems are the extensive and expensive treatment of the stick water that is required and the problems encountered in drying the defatted solids. Stick water is the water that is separated from the fats and solids in a wet rendering method and it contains substantial quantities of water soluble proteins. With certain types of raw materials and under certain operating conditions, the protein solids are difficult to dry. These materials tend to be sticky and adhere to heat transfer surfaces during the drying operation.

Often a centrifuge is employed in the wet rendering method. The liquid stream feeding it consists of water, fat and proteins, both soluble and insoluble, and is therefore often equally difficult to handle. The presence of proteins promotes the formation of emulsions which inhibit the complete separation of the fat from the liquid stream. The stick water separated in the centrifuge would contain in addition to insoluble and soluble proteins appreciable quantities of fat. In addition, the quantity of stick water is to be handled is typically very large. The raw material usually contains at least 50 percent water by weight and to extract the fat substantial additional water is needed. In a large plant, large quantities of stick water require a major capital investment in evaporators and/or water pollution control systems. The cost of operating these systems is high. Because of these problems, wet rendering is no longer a commercially significant process in the United States and Canada, where approximately half of the world's rendering production takes place.

The present invention contemplates a new and improved rendering process which overcomes all the above referred to problems and others not discussed to provide a new pretreatment and rendering process which is simple in design, economical to build and operate, readily adaptable to a plurality of types of materials to be rendered and which provides improved fat and protein solid products at a lower cost and with improved efficiency.

BRIEF SUMMARY OF THE INVENTION

The invention comprises forming a pumpable slurry of raw material to be rendered and treating it to certain temperatures for certain times to break down the water and fat emulsions contained within the slurry and to further insolubilize the proteins. When such emulsions are broken down, the fat becomes a generally continuous phase in the slurry and the water becomes a separate generally continuous phase in the slurry such that it is possible to centrifuge the slurry and the fats of the slurry may be separated from the water and solid proteins.

In accordance with the present invention, there is provided a rendering process comprising the steps of first comminuting raw material to reduce and generally conform the raw material to a plurality of raw material particles having generally preselected particle sizes; second, making a slurry comprising a mixture of the comminuted raw material and additional fat; third, evaporating the slurry to form a generally demulsified slurry including a generally continuous phase fat and a generally continuous phase water; and, fourth, segregating the continuous phase fat from the demulsified slurry.

In accordance with another aspect of the present invention, the step of making a slurry by mixing the comminuted raw material and additional fat comprises adding fat to the raw material having a temperature within the range of 140° F. to 270° F. in an amount such that the ratio of added fat to the dry defatted solids of the slurry is in the range of two to one to six to one, respectively. The addition of such hot fat allows the hot fat not only to be useful to facilitate pumping and transport of the raw material through the rendering method, but also conditions the raw material to break the raw material emulsions.

In accordance with another aspect of the present invention, evaporating the slurry to form a generally continuous phase fat and a generally continuous phase water comprises partially drying the slurry such that the solids of the slurry contain at least 15 percent by weight of water, as a percentage of total water and solids with all fat extracted. A primary purpose of the evaporation process is to condition the wet solids suspended in the fat in such a manner that the slurry may be processed in a centrifuge and split into a stream of clean fat and into a stream of wet solids containing very little residual fat.

One benefit obtained by the use of the present invention is a rendering process which provides improved efficiency of operation and a lower cost of rendering system construction.

Another benefit obtained from the present invention is a rendering process which provides component protein solids from rendered raw material having a lower residual fat content than was available in prior known dry rendering methods and systems.

A further benefit of the present invention is a rendering process which provides an improved quality component fat product from rendered raw material having a good clear color and which is partially deodorized.

Yet another benefit of the present invention, is a rendering process which pretreats rendered raw material to break down the raw material emulsions and insolubilize the raw material proteins to allow separation of the raw material water, proteins and fats without need for expensive mechanical extraction means such as screw presses.

Other benefits and advantages for the subject new pretreatment process for rendering will become apparent to those skilled in the art upon a reading and understanding of this specification.

BRIEF DESCRIPTION OF THE DRAWINGS

The invention may take physical form in certain parts and steps and arrangements of parts and steps, the preferred embodiment of which will be described in detail in this specification and illustrated in the accompanying drawings which form a part hereof and wherein.

DETAILED DESCRIPTION OF THE INVENTION

Figure 1:
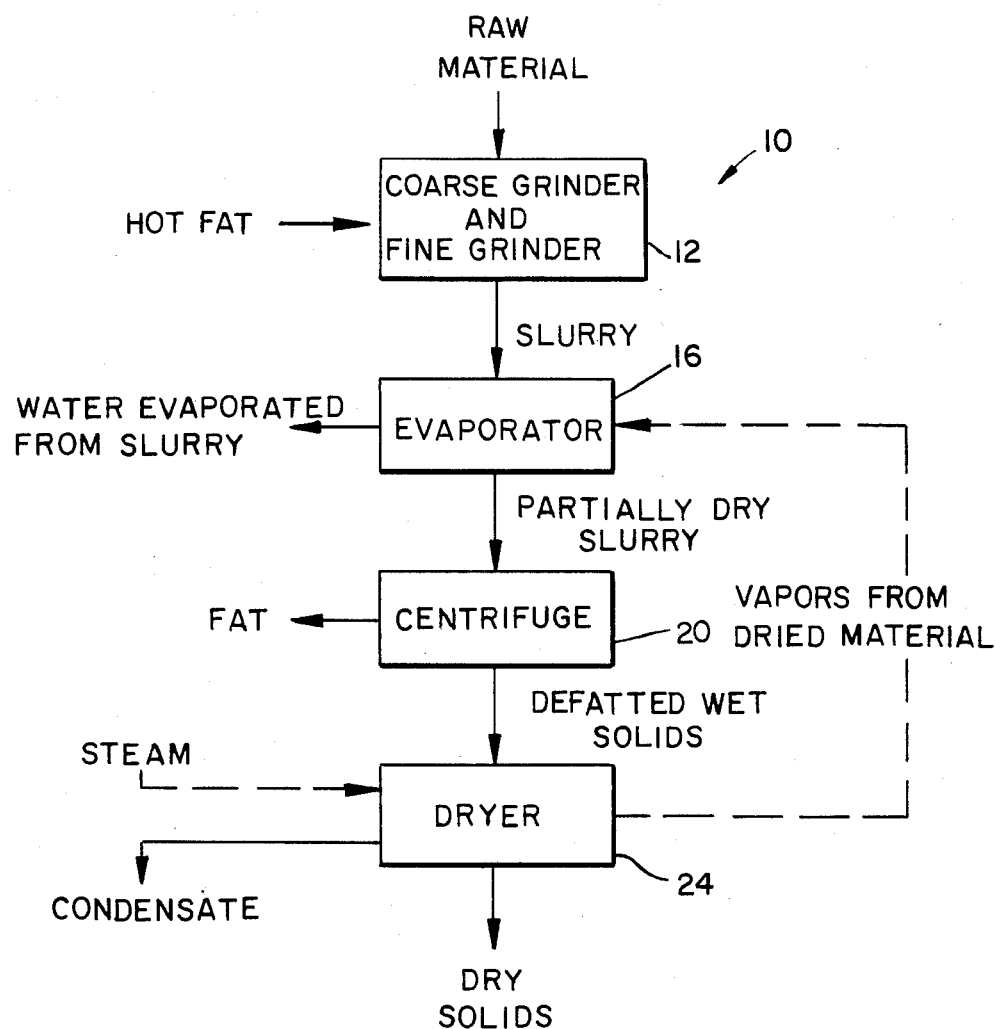
FIG. 1 is a schematic drawing illustrating the steps of a pretreatment and rendering process in accordance with the present invention; and, FIG. 2 is a schematic drawing illustrating a rendering system formed in accordance with the present invention.

Referring now to the drawings wherein the showings are for purposes of illustrating the preferred embodiment of the invention only and not for purposes of limiting same, the FIGURES illustrate a rendering process and system 10 for the rendering of organic raw material into its major component elements comprising water, fat and solid proteinaceous meal.

With specific reference to FIG. 1, the process of the present invention is schematically illustrated. Raw material, typically of animal origin, such as the flesh, fat, bones, offal (viscera), and blood of fish, poultry, beef, other livestock animals, including those portions of the animals obtained as by-products during the preparation of the animals for edible use as well as whole animals when they are not used edibly, is fed to a comminuting device 12 to reduce and generally conform the raw material to a plurality of raw material particles having generally preselected particle sizes. The comminuting device 12 typically comprises a coarse grinder as a first stage in the comminuting operating and, a fine grinder as a second stage to more particularly grind up the raw material to the preselected particle sizes. Hot fat is preferably added to the raw material during the fine grinding step to facilitate the fine grinding and pumpable transport of the resulting slurry mixture. The added hot fat preferably has a temperature within a temperature range of 140° F. to 270° F. During the entire rendering process it is always desirable to keep the temperatures to which the raw material is exposed as low as possible because the lower the temperature in the rendering process, the better the quality of the separated fat and protein solids.

The slurry comprises a mixture of proteins, bone, minerals, water, fat, some carbohydrates and a variety of water and fatty emulsions. The amount of hot fat added to the raw material particles to form the slurry includes at least two parts of the added hot fat by weight for each one part by weight of the dry, defatted solids in the raw material. The preferred ratio of hot fat to solid though, is a ratio preferably falling within a range of 4 to 1 and 6 to 1 of fat to dry defatted solid. The quantity of hot fat thus added operates to break a portion of the slurry emulsions that would normally result and to prevent the formation of additional emulsions that would otherwise result. After the slurry is formed it is pumped to an evaporator 16 and heated and evaporated to such an extent that the water and fat emulsions in the slurry are broken. The slurry will ultimately include a generally continuous phase fat and a generally continuous phase water. The formation of continuous phases of fat and water greatly improves the separation of these components according to the rendering process of the present invention.

The step of evaporating the slurry comprises exposing the slurry in the evaporator 16 to a temperature of at least 140° F. for a period of at least five minutes. The slurry is preferably retained in the evaporator for a period within a range of 5 to 20 minutes at a temperature within a range of 140° F. to 270° F. Again though, it is desirable to employ temperatures as low as possible to produce products of the highest quality possible. The slurry is agitated in the evaporator 16 such that the slurry is recycled in the evaporator at least five times the rate of feed of the slurry to the evaporator. Water evaporated from the slurry in the evaporator 16 is sewered as waste.

Typically the water in the slurry would be present as free water, as a component mixed in and/or emulsified with the fat in the slurry and as a component in the raw material solids. The amount of water removed during the evaporation step comprises all of the free water, substantially all of the water in the fat and a substantial part of the water in the solids. The amount of water evaporated should be such that at least 15 percent by weight of water as measured as a percentage of total water and solids with all fat extracted, remains with the solids which discharge from the evaporator 16 as part of the partially dried slurry. To conserve energy it is often advantageous to reduce the amount of water evaporated such that at least 40 percent but no more than 65 percent by weight of water measured as a percentage of total water and solids with all fat extracted remains with the solids. The range of 15 to 65 percent by weight of water allows the practice of the invention.

The evaporating step comprises removing an amount of water to complete insolubilizing the proteins in the slurry and breaking the fat and water emulsions wherein the fats of the raw materials become continuous phase fat and a substantial portion of the remaining water of the raw material becomes a continuous phase water.

After partial evaporation, the slurry is moved to a centrifuge 20 in which the fat is removed from the deemulsified slurry. The step of segregating the fat comprises centrifuging the slurry to split the slurry into at least two product streams coprising a first stream of wet solids and a second stream of polished fat. The first stream of wet solids contains at least 15 percent by weight of water and less than 6 percent by weight of fat. The second stream comprises polished fat containing less than 0.2 percent by weight of insoluble solids. The purity of the polished fat stream obviates the need for further fat clarification such as polishing centrifuges and filtering equipment. The low residual fat content of the wet solids provides substantial improvement over heretofore known rendering processes and avoids the need for additional mechanical fat separation equipment such as screw presses. The condition of the defatted wet solids is such that they may be readily dried in a dryer 24 such as a continuous or batch dryer of the types conventionally used in the rendering industry. The pretreatment process of the present invention venders the defatted wet solids in a nonsticky condition and avoids the problems of the wet solids sticking to the heating elements of the dryer 24. The finished dry solids product discharged from the dryer 24 may be sized and bagged or shipped in bulk. As noted above, the fat or polished fat removed from the centrifuge 20 is a finished product and no further treatment is necessary. A conventional heat source such as a steam line is communicated to the dryer 24 for drying of the defatted wet solids. Water removed from the wet solids and the dryer step is sewered as condensate. The hot vapors from the dried material of the dryer 24 may be utilized in the evaporator 16 to avoid water of energy and to improve the efficiency of the rendering process of the invention.

Figure 2:
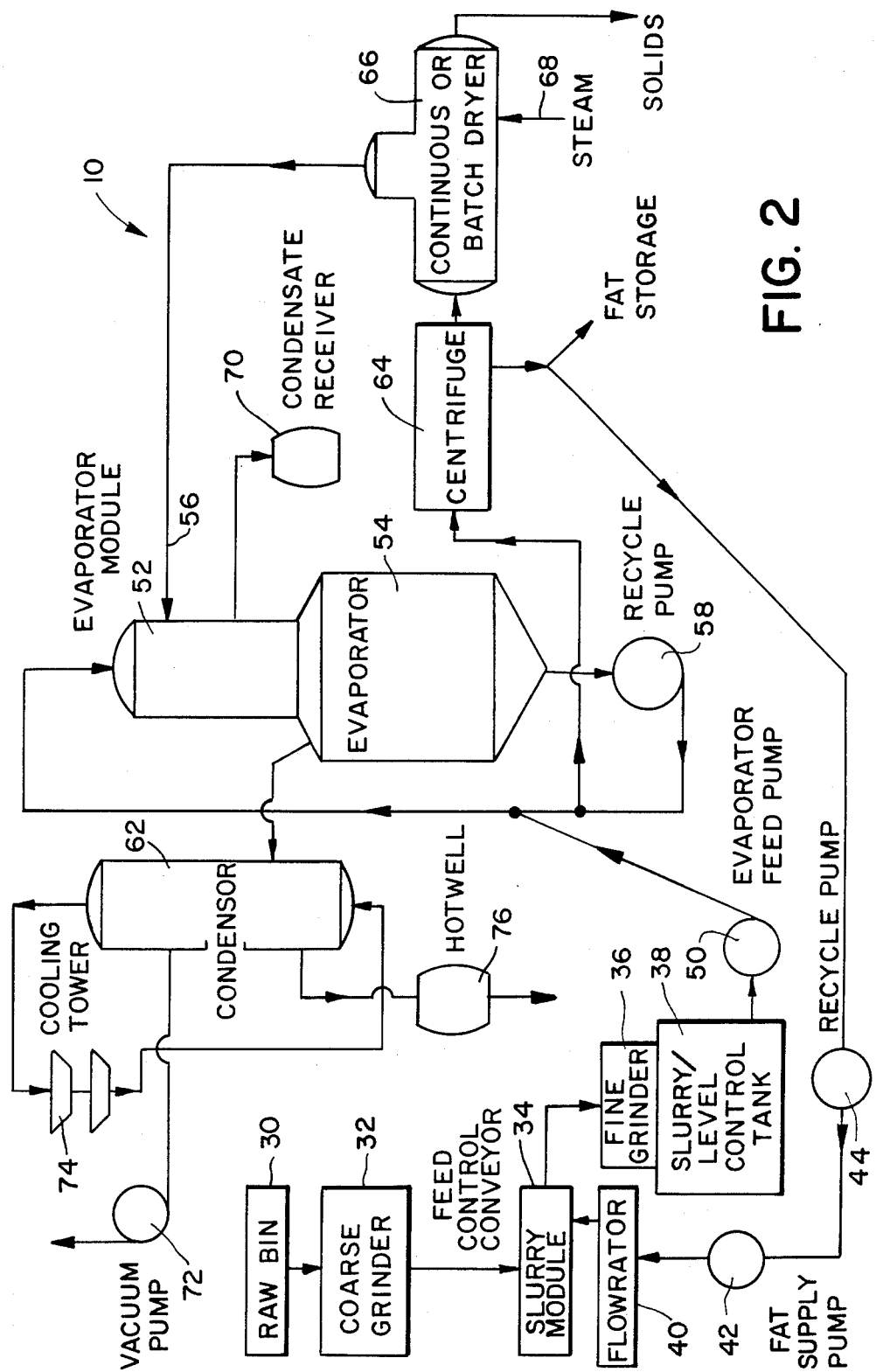

With particular reference to FIG. 2, a rendering system formed in accordance with the present invention is more particularly illustrated. The raw material to be rendered is initially stored and provided to the system from a raw bin 30. The raw material is first conveyed to a coarse grinder 32 in which the raw material is ground up to generally coarse particle sizes. After coarse grinding, the raw material is conveyed by a feed control conveyor to a slurry module 34 which controls by weight the amount of coarsely ground raw material to be conveyed to the fine grinder 36. The fine grinder is in association with a control tank 38 which receives the finely ground raw material. Preferably the raw material is ground to a plurality of raw material particles having a diametrical extent generally no greater than three-fourths of an inch. A flowrator 40 and fat supply pump 42 operate to provide an additional mixture of hot fat to the fine grinder 36 to facilitate the fine grinding step. The mixture of the fat lubricates the fine grinding operation. The finely ground raw material particles received in the control tank 30 are mixed with a controlled amount of fat at a particular temperature to enhance break down of the water and fat emulsions in the raw material and, further, to provide transport convenience of the resulting slurry. A recycle pump 44 provides fat to the control tank 38 from a down-line fat source of the system. The fat added to the control tank 38 preferably has a temperature within the range of 140° F. to 270° F. and the amount added to the raw material particles to form the slurry preferably provides a ratio of added hot fat to solids falling within a range of 4 to 1 and 6 to 1 parts by weight of the fat to the dry, defatted solids weight of the solids. It has been found that such a mixture operates to indeed demulsify in part the raw material slurry. The slurry is then pumped by a feed pump 50 to an evaporator module 52 and evaporator unit 54. The feed pump 50 provides a measured rate of supply of the slurry to the evaporator module 52 so that the slurry can be exposed for a preselected time at a preselected temperature in the evaporator. Such control is effective to complete insolubilizing the proteins in the slurry and breaking the water and fat emulsions contained therein so that the slurry will ultimately include a generally continuous phase fat and a generally continuous phase water. The evaporator module 52 also includes an input source of hot vapor 56 from a down-line source of heated vapor to heat the slurry pumped to the module 52 and evaporator 54. Preferably, the slurry is retained within the evaporator 54 for a period within a range of 5 to 20 minutes at a temperature within a range of 140° F. to 270° F. The slurry is agitated in the evaporator such that the slurry is recycled in the evaporator by a recycle pump 58 at least five times the rate of feed to the evaporator by the evaporator feed pump. The evaporating step preferably removes 75 percent to 80 percent by weight of the water in the solids measured as a percentage of the total weight of water and defatted solids which is discharged from the evaporator 54.

It has been found that the combination of these treatment steps and methods does indeed operate to insolubilize the proteins and deemulsify the slurry to form a continuous phase fat and a continuous phase water in the slurry. The partially dried slurry is communicated to a centrifuge 64 for segregation of the fat from the demulsified slurry. The centrifuge 64 operates to split the slurry into two product streams comprising a first stream of wet solids which are communicated to the dryer 66 and a second stream of polished fat, a portion of which is communicated to fat storage and a second portion of which may be communicated to recycle pump 44. The fat emanating from the centrifuge 64 contains less than 0.2 percent by weight of insoluble solids. The wet solids are communicated to a continuous or batch dryer 66 which is heated by a steam supply 68. Hot vapors from the dryer 66 are communicated to the evaporator module 52 along conduit 56 for heating of the raw material slurry in the evaporator. The dry solids produced from the dryer 66 contain less than 6 percent residual fat and do not require any further mechanical pressing to remove the fat such as may be involved in a conventional screw pressing step. In addition, due to the low residual fat content of the solids and the insoluble condition of the proteins, the solids are not sticky and do not adhere to the engaging hot element surfaces of the dryer 66. The solids produced from the dryer 66 comprise a finished solids product and may be sized and bagged or shipped in bulk.

The water removed by the evaporator 54 is expelled as both a vapor and as a condensate. The vapor is communicated to condenser 62 and the condensate is communicated to a hot well 70. The vapor is condensed under a vacuum in the condenser 62 produced by vacuum pump 72. The condenser is a conventional condenser and a hot well 76 is included to receive the condensed water.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A rendering process comprising the steps of:
   comminuting raw material to reduce and generally conform the raw material to a plurality of raw material particles having generally preselected particle sizes;
   making a slurry comprising a mixture of the comminuted raw material and additional fat;
   evaporating the slurry to form a generally demulsified slurry including a generally continuous phase fat and a generally continuous phase water; and
   segregating said continuous phase fat from the demulsified slurry.

2. The process as described in claim 1 wherein the step of comminuting comprises the steps of:
   coarse grinding the raw material in a coarse grinder; and,
   fine grinding the raw material in a fine grinder, said fine grinding step further including adding hot fat to the raw material to facilitate the fine grinding.

3. The process as defined in claim 1 wherein said comminuting step comprises comminuting the raw material to a plurality of the raw material particles having a diametrical extent generally no greater than three-fourths of an inch.

4. The process as defined in claim 1 wherein the step of making a slurry comprises adding hot fat to said raw material, said hot fat having a temperature within a temperature range of 140° F. to 270° F.

5. The process as defined in claim 4 wherein said raw material includes a component portion of dry defatted solids and wherein said step of adding hot fat comprises adding a quantity of hot fat to said raw material particles to form said slurry such that said slurry includes at least two parts of said added hot fat by weight for each one part by weight of the dry defatted solids in said raw materials.

6. The process as defined in claim 5 wherein said slurry has a ratio of said added hot fat to said dry defatted solids preferably between four to one and six to one of said fat to said dry, defatted solids.

7. The process as defined in claim 6 wherein said raw materials includes fat and water emulsions and said quantity of hot fat is added in an amount to break a portion of said emulsions.

8. The process as defined in claim 1 wherein the step of evaporating the slurry comprises exposing said slurry in an evaporator to a temperature of at least 140° F. for a period of at least five minutes.

9. The process as defined in claim 8 wherein said slurry is agitated in the evaporator such that the slurry is recycled in the evaporator at least five times a rate of feed of the slurry to the evaporator.

10. The process as defined in claim 8 wherein said slurry is preferably retained in the evaporator for a period within a range of five to twenty minutes at a temperature within a range of 140° F. to 270° F.

11. The process as defined in claim 1 wherein the raw material includes solids and water and the step of evaporating the slurry comprises removing by evaporation a portion of said water leaving at least 15 percent by weight of the water with the solids measured as a percentage of the total water and defatted solids of the partially dried slurry.

12. The process as defined in claim 11 wherein the evaporating step preferably removes water leaving 20 to 25 percent by weight of the water with the solids.

13. The process as defined in claim 11 wherein said step of evaporating preferably removes water in a reduced energy rendering process leaving 40 to 65 percent by weight of water with the solids.

14. The process as defined in claim 11 wherein said slurry includes fats and proteins and fat and water emulsions; said evaporating step comprising removing an amount of water to insolubilize said proteins and to break said fat and water emulsions wherein said fats become continuous phase fat and said water becomes a generally continuous phase water.

15. The process as defined in claim 1 wherein the step of segregating the continuous phase fat comprises centrifuging said slurry to split said slurry into two product streams comprising a first stream of wet solids and a second stream of polished fat.

16. The process as defined in claim 15 wherein said first stream comprises wet solids containing at least fifteen percent (15%) by weight of water and less than six percent (6%) by weight of fat.

17. The process as defined in claim 15 wherein said second stream comprises polished fat containing less than two-tenths of one percent (0.2%) by weight of insoluble solids.

18. The process as defined in claim 1 further including the steps of:
  segregating wet solids from said slurry; and,
  drying said wet solids.

19. A rendering process for rendering organic material comprising the steps of:
  comminuting a raw material comprised of water, fat, and proteinaceous material to reduce said raw material to a plurality of particles having generally preselected sizes;
  mixing additional fat with said comminuted raw material to form a slurry;
  evaporating a portion of the water in said slurry to form a partially dried slurry by exposing said slurry to an elevated temperature of at least 140° F. for a period of at least five minutes, said partially dried slurry remaining at least 15% by weight water, said elevated temperature serving to insolubilize said proteinaceous material and break down fat and water emulsions in said slurry thereby forming a generally continuous phase fat and a generally continuous phase water; and,
  subsequently centrifuging said slurry to remove substantially all of said generally continuous phase fat from said slurry thereby obviating the need for a subsequent deoiling step.

20. The process of claim 19 wherein said step of centrifuging said slurry also clarifies said generally continuous phase fat to remove insoluble solids therefrom such that said removed continuous phase fat contains less than 0.2% by eight of insoluble solids.

21. The process of claim 19 further comprising the step of agitating said slurry during said step of evaporating.

22. A rendering process for rendering organic raw material comprising the steps of:
  comminuting a raw material comprising fat, water, and solids;
  providing additional fat;
  mixing said additional fat with said comminuted raw material to form a slurry;
  heating said slurry to a temperature of at least 140° F. for a time period long enough to insolubilize said solids and break down any fat-water emulsions in said slurry thereby forming a generally continuous phase fat and a generally continuous phase water;
  subsequently contrifuging said slurry to remove substantially all of said generally continuous phase fat from said slurry such that said centrifuged slurry is less than six percent (6%) by weight fat thereby obviating the need for subsequently pressing said slurry to remove fat; and,
  clarifying said slurry simultaneously with said step of centrifuging to remove insoluble solids from said continuous phase fat such that said removed continuous phase fat is less than 0.2% by weight of insoluble solids.

* * * * *